Aug. 28, 1945.    W. W. SLOANE    2,383,894
FLUID OPERATED CONTROL SYSTEM
Filed Aug. 28, 1942    4 Sheets-Sheet 1

INVENTOR.
WILLIAM W. SLOANE
BY
Clarence F. Poole
ATTORNEY

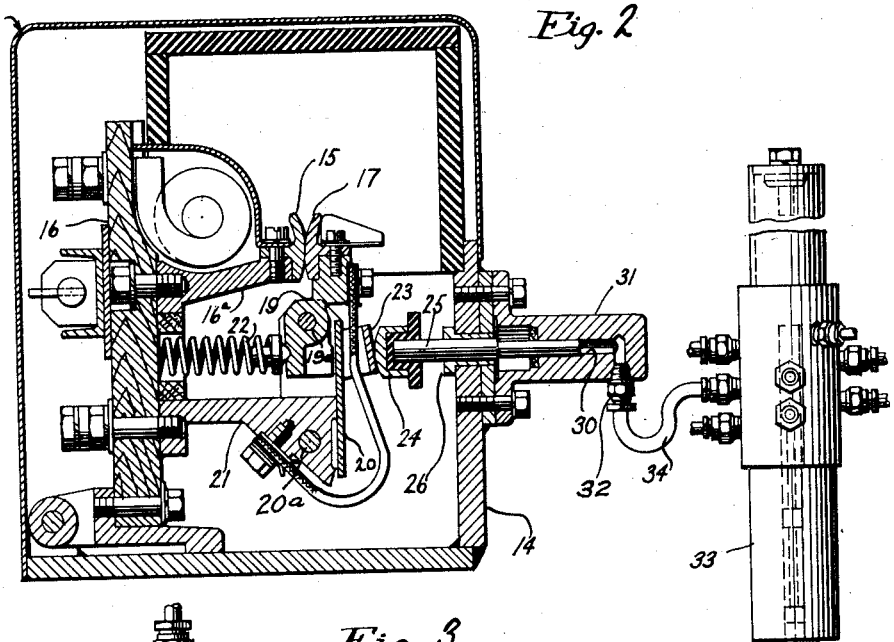
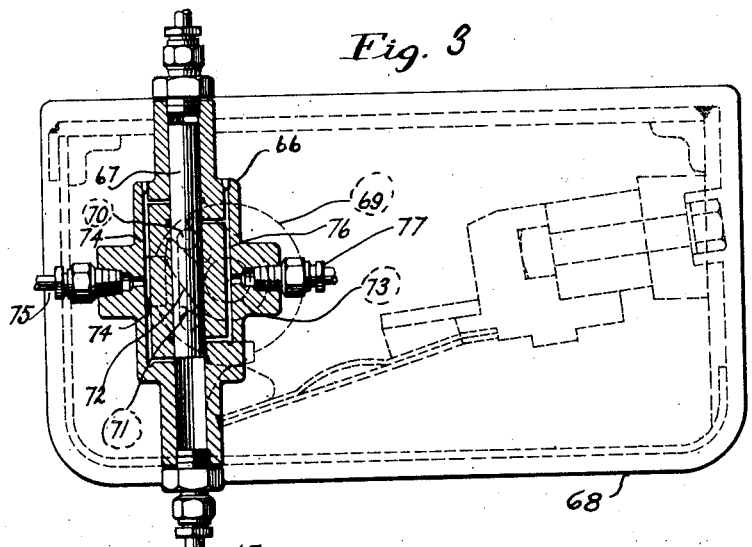
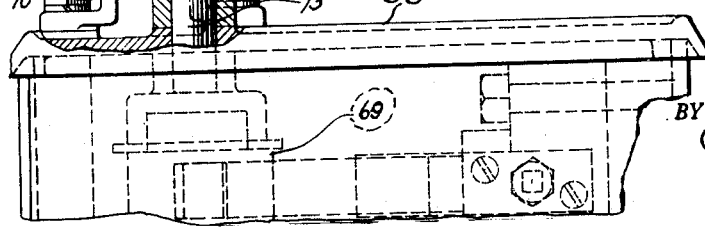

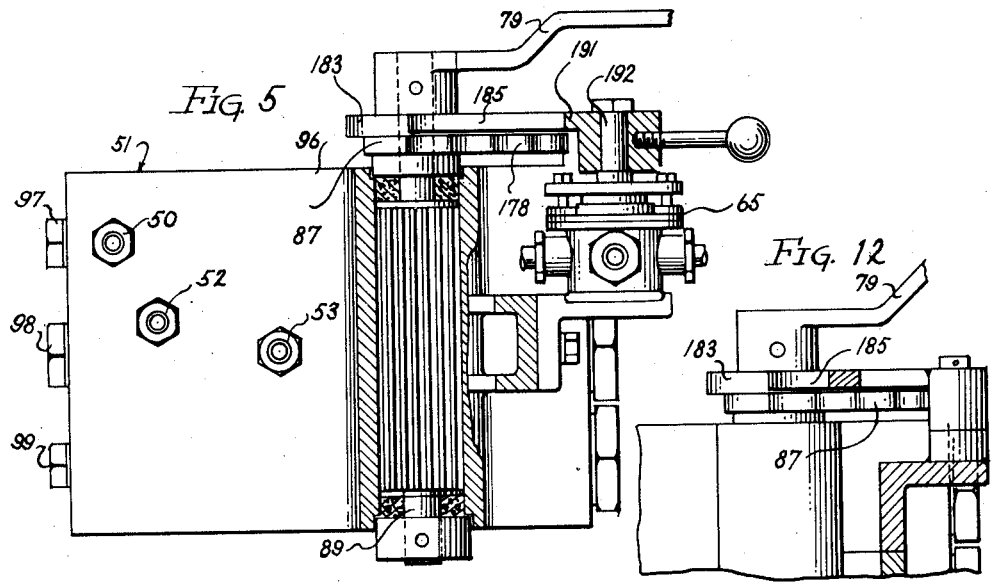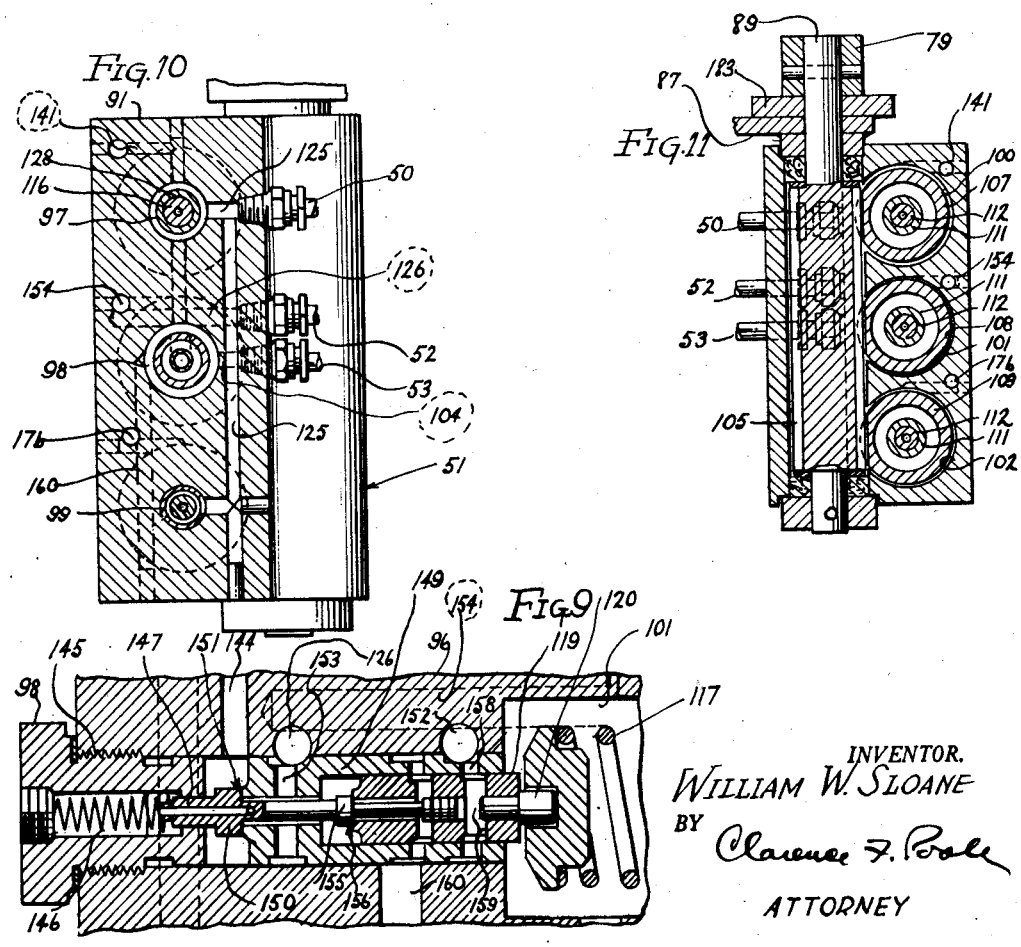

Aug. 28, 1945. W. W. SLOANE 2,383,894
FLUID OPERATED CONTROL SYSTEM
Filed Aug. 28, 1942 4 Sheets-Sheet 4

INVENTOR.
William W. Sloane
BY Clarence T. Poole
ATTORNEY

Patented Aug. 28, 1945

2,383,894

UNITED STATES PATENT OFFICE 2,383,894

FLUID-OPERATED CONTROL SYSTEM

William W. Sloane, Chicago, Ill., assignor to Goodman Manufacturing Company, Chicago, Ill., a corporation of Illinois Application August 28, 1942, Serial No. 456,490

14 Claims. (Cl. 303—54)

This invention relates to a variable pressure fluid control valve mechanism adapted to supply pressures at values increasing or decreasing predetermined amounts according to the position of the operating handle for the valve mechanism.

An object of my invention is to provide a novel form of control valve adapted to supply fluid under pressure to an hydraulically operated device, so arranged that as the control handle of the valve is turned to successive positions in one direction, the pressures of the fluid passing therefrom will increase in predetermined step by step values to a maximum, and as said valve is turned to successive positions in the opposite direction, the pressure of the fluid passing therefrom will decrease by predetermined values, and the pressures at any intermediate position between an on or off position will be substantially the same when the valve is being opened or closed.

Another object of my invention is to provide a variable pressure hydraulic control valve of the poppet type with means for reducing the unbalanced pressure on the valve seat by maintaining a pressure difference on opposite sides of the valve within predetermined limits, throughout its entire pressure range.

In carrying out my invention I provide a variable pressure hydraulic control valve including a piston type charging valve, a piston type discharge valve and poppet type pressure adjusting valves, and so connect and arrange these valves that the piston valves will maintain a pressure difference on opposite sides of the poppet valves within predetermined limits, throughout the entire pressure range thereof, when the control handle of the valve is turned in an on or an off direction.

Other objects and novel features of my invention will appear from time to time as the following specification proceeds and with reference to the accompanying drawings wherein:

Figure 2 is a transverse sectional view taken through a controller constructed in accordance with my invention and showing a distributor valve connected thereto, for supplying fluid under pressure thereto;

Figure 3 is a top plan view of a casing for a reverse drum, with a fluid motor for operating the reverse drum shown in horizontal section;

Figure 4 is a fragmentary view in side elevation of the control casing, showing the valve for operating the reverse drum in transverse section;

Figure 5 is a view in side elevation of the control valve, for supplying fluid to the distributor valve under different pressures, with parts of the valve shown in section;

Figure 9 is an enlarged detail partial fragmentary longitudinal sectional view of the valve shown in Figure 7, in order to more clearly illustrate certain details thereof;

Figure 10 is a transverse sectional view taken substantially along line 10—10 of Figure 6;

Figure 11 is a transverse sectional view taken substantially along line 11—11 of Figure 6; and Figure 12 is a fragmentary detail view in side elevation of the valve shown in Figure 5, with certain parts shown in section, and illustrating more clearly certain details of the interlocking connection between the valve which controls reversal of the control circuit.

Figure 1:
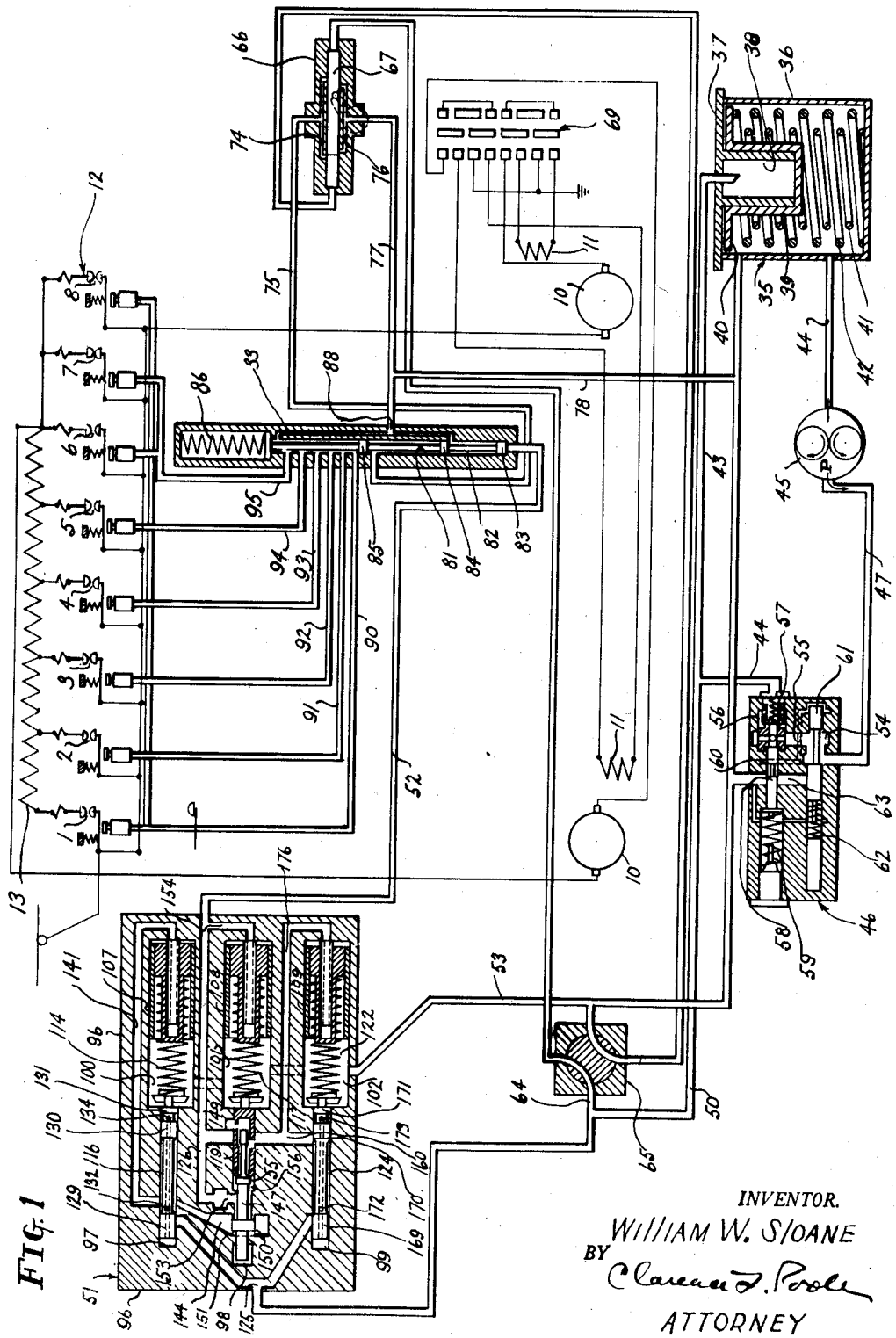
Figure 1 is a diagrammatic view illustrating an electrical control circuit for two motors of an electrical device such as a locomotive, and showing the fluid circuit for controlling operation thereof.

In Figure 1 of the drawings an electrical control circuit is shown which is particularly adapted to control the simultaneous operation of a plurality of motors, preferably the motors of a mine locomotive, and a hydraulic control system arranged in accordance with my invention, is shown for controlling operation of the electrical contacts of this control circuit. The motors are herein shown as being connected in parallel for simplicity, it being understood that the electrical control circuit may be so arranged as to connect them in series or in series parallel, or in any other desired manner. Said motors each consist of an armature 10 and a field 11, and starting and stopping thereof is controlled by an electrical controller generally indicated by reference character 12. Said controller includes a plurality of fluid-operated contactors 1, 2, 3, 4, 5, 6, 7 and 8, for connecting the motors in the power line and for progressively cutting sections of a resistance 13 from the motor circuit.

The controller 12, as illustrated in Figure 2, includes a casing 14 forming an enclosure for the contactors 1 to 8 inclusive. Said contactors are each of the same construction so contactor 1 only will herein be shown and described in detail. Said contactor includes a stationary contact 15 mounted on an insulating board 16, and a movable contact 17 engageable with said stationary contact. Said movable contact is mounted on a pivoted arm 19, which is pivoted intermediate its ends to a swinging arm 20 on a pivotal pin 19a. Said swinging arm is transversely pivoted to a stationary support bracket 21 on a pivotal pin 20a. A coil spring 22 is interposed between the insulating board 16 and the free end of the arm 19 and is adapted to move the contact 17 to an open position with a wiping action by pivoting said swinging arm 20 about the axis of the pin 20a against a fluid plunger 25. The swinging arm 20 is provided with an engaging abutment 23 projecting outwardly therefrom, which is engaged with an engaging member 24 on the end of the plunger 25. Said plunger is slidably mounted in a bearing 26, carried in an end wall of the casing 14, and extends outwardly from said casing into a fluid chamber 30, formed in a cylinder 31 secured to the outside of said casing. A fitting 32 connects said fluid chamber with a distributor valve 33 through a pipe 34. Suitable packing is provided to prevent fluid from entering said casing. Thus when fluid is admitted to the chamber 30, the plunger 25 is moved in a direction to pivot the arm about the axis of the pin 20a to engage the contact 15 with the contact 17. Said plunger then pivots the arm 19 about the axis of the pin 19a to fully engage said contacts against the spring 22 with a wiping action, it being understood that the spring 22 serves to disengage said contacts, when pressure is released from said chamber and to exhaust fluid from said chamber. The fluid operating mechanism for the contactor is entirely outside of the contactor casing, so that no fluid will enter said casing. A leakage drain (not shown) may be provided to permit fluid which may leak past said plunger to return to the fluid storage tank.

Referring now in particular to the fluid diagram illustrated in Figure 1, a fluid pump 45 is provided to effect pressure in the system. Said pump is connected with an accumulator 35 by means of a pipe line 44, which accumulator serves as a fluid storage tank for the hydraulic system. Said accumulator may be of any well known form and, as herein shown, includes a cylindrical tank 36 having a cover 37. Said cover is provided with an inwardly extending cylindrical portion 38, extending within and opening into said tank. A cylindrical piston 39 is mounted on said cylindrical portion 38, for slidable movement with respect thereto. Said piston has a closed inner end and a flanged portion 40, adapted to abut the inside of said cover 37, when said piston is in a retracted position. A pair of concentrically arranged compression springs 41 and 42 are interposed between the bottom of said tank and the inside of said flange 40 of said piston, to urge said piston into a retracted position.

A high pressure pipe line 43 connects the inwardly extending cylindrical portion 38 of said accumulator with the pump 45 through a relief valve 46, so that pressure in the fluid system will supply pressure to said cylinder 38 and cylindrical piston 39 and move said piston against the compression springs 41 and 42, to compress said springs. The strength of said springs is such that fluid under pressure accumulated in said cylinder and piston, will be supplied to the system through said springs, whenever said fluid pump stops.

The pump 45, which supplies fluid under pressure to said accumulator and to the hydraulic system, is herein shown as being a well known form of gear pump and is connected with the relief valve 46 by means of a pipe line 47. Said relief valve has connection with the pipe line 43, leading to the pressure side of the accumulator, by means of the pipe line 44, which is also connected to a pressure pipe line 50, leading to a control valve 51, which serves to supply fluid to the distributor valve 33 at progressively increasing or decreasing pressures, through a control pipe line 52. A low pressure pipe line 53 leads from said relief valve to the cylindrical tank 36 of the accumulator 35.

The relief valve 46 is so arranged that under normal pressures fluid will pass from the pipe line 47 through a chamber 54 of said valve, through a passageway 55, and chamber 56, to and through a check valve 57 to the pipe line 44. Upon overload, fluid under pressure in the chamber 56 will move a piston 58 in said chamber 56 against a spring 59, to a position to open a port to a passageway 60, to permit fluid under pressure to engage the under side of a piston 61 in the chamber 54. This will move said piston against a spring 62 and open a port leading to a passageway 63, to bypass fluid through said passageway to the tank 36 of accumulator 35, through the pipe 53. Upon the release of pressure, the spring 59 will move the piston 58 in a direction to close the passageway 60 to fluid under pressure and open said passageway to the return line 53. At this time pressure will be relieved from the piston 61, and the spring 62 will move said piston in a direction to close the passageway 63.

A pipe line 64 leads from the pipe line 50 to a 4-way valve 65, which serves as a reversing valve, for reversing the direction of the flow of fluid to a reversing cylinder 66. Said cylinder is provided to operate a reverse drum 69 for the motors of the locomotive and has a piston 67 movable therein, which is connected with said reverse drum by means of a depending pin 70 (see Figures 3 and 4). Said reversing cylinder 66 is shown as being mounted on the outside of a casing 68 for said reverse drum and the contacts therefor. The pin 70 depends from said piston, intermediate the ends thereof, and extends through a slot 71 in the lower portion of said cylinder and has engagement at its lower end with a slotted lever arm 72, secured to the upper end of a shaft 73, upon which said reverse drum is mounted. Rectilinear movement of said piston in one direction or another will thus turn said reverse drum 69 to a forward or reverse position in an obvious manner.

The body of the reversing cylinder 66 is provided with a longitudinally extending pressure passageway 74 opening into said cylinder at longitudinally spaced points, which are spaced equally from the transverse center of said cylinder so that one or the other openings to said passageway will be uncovered by said piston when said piston is in one extreme position or another. Said passageway is connected with a pressure pipe 75, which is connected with the distributor valve 33, for supplying fluid under pressure to the fluid-operating mechanism for the contactors 1 to 8 inclusive, in a manner which will hereinafter more clearly appear as this specification proceeds.

Since the passageway 74 is only open to the cylinder 66, when the piston 67 is in one extreme position or another and the reverse drum is in either a forward or reverse position, fluid under pressure can only flow from reversing cylinder 66 to the distributor valve 33, when said reverse drum is in one of these positions. Thus, a hydraulic interlock is provided between said distributor valve and reverse drum, to prevent operation of said distributor valve, until said reverse drum is in the proper operating position.

Another passageway 76 is provided in the cylinder 66 to take care of any leakage between the piston 67 and the walls of said cylinder. A pipe 77 leads from said passageway to a pipe 78, which connects with the drain pipe 53, leading to the storage tank 36 of the accumulator 35.

The distributor valve 33 is provided with a cylindrical chamber 81, having a piston 82 movable therein. Said piston has three spaced apart lands 83, 84 and 85, the land 83 being at the end of said piston adjacent the inlet from the control pipe 52, so that fluid under pressure, entering said valve from said pipe, will move said piston against a coil spring 86, interposed between the inner end of said chamber and the end of said piston opposite from the land 83.

A drain passageway 88 is provided in the body of the distributor valve 33 and leads from a position between the lands 83 and 84 to a position above the land 85, when the piston 82 is in an extreme on position, to take care of any leakage of fluid past said lands 83, 84 and 85. Said drain passageway is connected with the pipe 78, which leads to the tank 36 of accumulator 35.

The pressure pipe 75 enters the distributor valve 33, intermediate the ends thereof at a point disposed adjacent the lower end of the land 85, when the piston 82 is at an extreme off position and the spring 86 is extended, as in Figure 1. The lands 84 and 85 are so spaced that fluid under pressure will be supplied in the space between said lands by said pressure pipe, in all positions of said piston in said cylindrical chamber 81. It should be noted that fluid admitted from the pipe 75 acts equally in opposite directions on the piston 82, so has no tendency to move said piston in the direction of its axis.

Pipes 90, 91, 92, 93, 94 and 95 lead from ports in the chamber 81, which are disposed on the opposite side of the land 85 from the lands 83 and 84, when the piston 82 is in an off position. Said pipes are so arranged that the respective passageways connecting said pipes to the chamber 81 will be successively uncovered by the land 85, to admit fluid under pressure from the pipe 75 thereto, upon movement of the piston 82 against the spring 86. Thus, as the piston 82 moves to successively uncover the passageways 90 to 95 inclusive, the contactors associated therewith will be closed in the hereinbefore described manner, to connect the motors of the locomotive in the main line circuit, and to cut out the resistance 13 from the motor circuit, step by step, under control of the operator.

The strength of the spring 86 is such that the piston 82 will move to uncover the passageway leading from the pipe 90 when fluid enters the chamber 81 from the pipe 52 at a predetermined pressure, and will uncover the next passageway when the fluid pressure increases a predetermined amount, and so on until all of the passageways are uncovered step by step.

It will be understood that in order to insure proper functioning of the distributor valve 33 in the manner above described, the control valve 51 for supplying pressure to the chamber 81 must be such as to produce uniformly accurate and positive step-by-step pressure values in said chamber corresponding with the several positions of the control handle 79 of said control valve. Ordinary hydraulic control valves, as well as so-called hydraulically balanced valves, have been found inadequate for this purpose, due mainly to certain inherent characteristics of such valves which tend to produce different pressure values at the same position of the control handle, depending upon whether the said handle is being moved toward its on or its off position. For instance, valves of the sliding piston type can be hydraulically balanced but they necessarily operate with a time lag in opening or closing, which produces substantial variations in step-by-step pressure output, depending upon whether the pressure is to be reduced or increased. On the other hand, valves of the poppet type open and close almost instantaneously, but it is much more difficult to balance valves of the poppet type so that they will always open or close at exactly the same predetermined pressures, because they are subject to uneven or variable distribution of pressure on their valve seat areas. Such variations are caused by changes in the effective area of contact between the valve and its seat due to numerous unpredictable factors, such as infinitesimal inaccuracies in machining, wear, variations in operating pressures, temperature changes, or the like.

Referring now in particular to the control valve 51, which supplies fluid under pressure to the distributor valve 33 through the control line 52, at uniformly increasing or decreasing pressures, which change step by step for each port opening of said distributor valve as a control handle 79 of said valve is turned by the operator in one direction or another, said control valve is especially designed to maintain substantially the same pressures in the control line at the same position of the control handle, when said control handle and valve are turned in an on or an off direction. Said control valve, as herein shown, is in the form of a triple valve including a block 96 having three valve elements 97, 98 and 99 therein, controlled in unison by the control handle 79.

The valve element 97 is of the piston type and serves as a charging valve for controlling the admission of fluid under pressure to the pressure side of the valve element 98. The variation in pressure resulting from said charging valve as it is admitting fluid from a lower to a higher pressure and from a higher to a lower pressure, is independent of pressure in the intake pressure line 50, and is due mainly to the lap of the piston which introduces a time lag in the opening and closing of said valve. As previously explained, a single valve of this type would not be sufficiently accurate to insure full and accurate opening of the ports in the distributor valve.

Valve 98 is of the poppet type and includes separate pressure and release poppet valves, the normal characteristics of which are such that they will open practically instantaneously on the slightest movement of their control means. Said valves, however, are subject to the errors inherent in poppet valves due to the unbalanced pressures on the valve seat areas as previously suggested. However, the valve element 98, when used in conjunction with the valve elements 97 and 99, serves to adjust the pressure in the control line at the proper pressures corresponding with different positions of the control handle, with little or no error, when the valve elements 97, 98 and 99 are simultaneously turned in an on or an off direction.

The valve element 99 is of the piston type similar to the valve element 97, and fluid discharged through the valve element 98 is discharged through the end of said valve element 99. This valve element may therefore be called a discharge valve. This valve element and the valve element 97 serve to maintain predetermined pressure differences on opposite sides of the poppet valve element 98, which will be within a certain tolerance throughout the entire pressure range thereof, thereby reducing any pressure inaccuracies that might be caused by unbalanced pressures on the valve seat areas of said poppet valves, as will hereinafter more clearly appear as this specification proceeds. These three valve elements are thus combined and controlled in unison so the pressure errors of one valve will be corrected by the other, to accurately maintain the pressure in the control line to very close limits in order that there may be no chance of a port of said distributor valve being partly open at a position of the control handle when it should be fully open.

Figure 7:
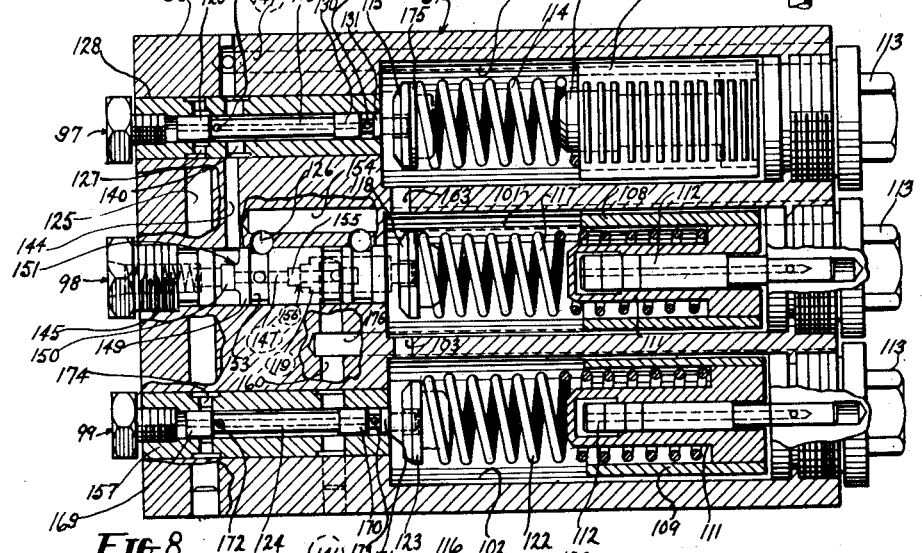
Figure 7 is a longitudinal sectional view taken through the valve shown in Figure 5.

The valve elements 97, 98 and 99 communicate with three aligned cylindrical chambers 100, 101 and 102 formed in the block 96 of the valve element 51 (see Figures 7, 9 and 10). Said chambers are each connected with the low pressure side of the accumulator 35 by means of passageways 103, 103, connecting the outer chambers with the inner chamber (see Figure 7), and a passageway 104, connecting the inner chamber with the return pipe 53 (see Figure 10). Said chambers 100, 101 and 102, besides forming return passageways for the fluid, also form enclosures for the control means for said respective valve elements 97, 98 and 99.

Figure 6:
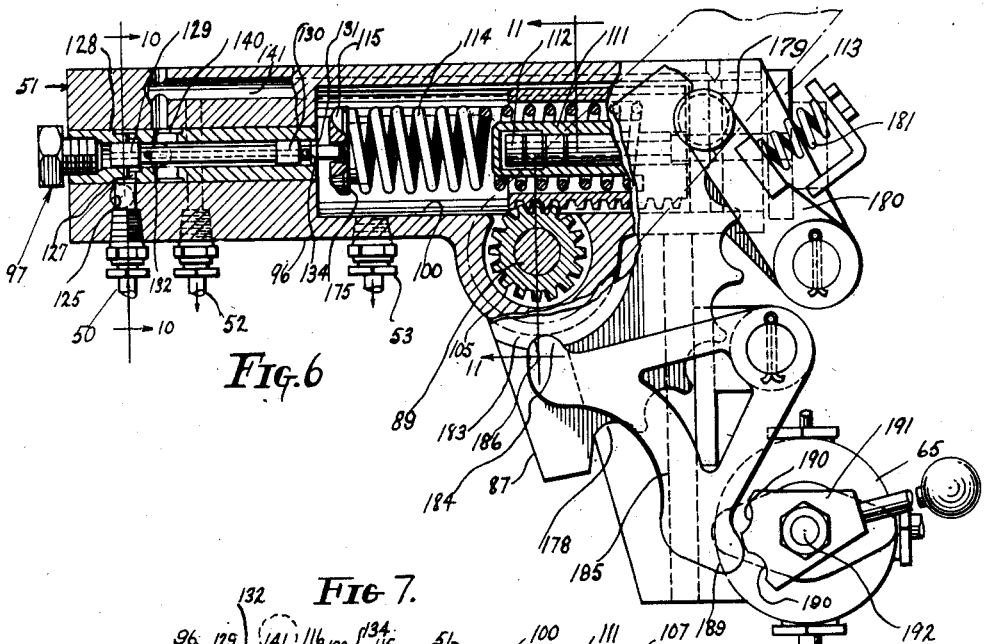
Figure 6 is a top plan view of the valve shown in Figure 5, with certain parts of the valve shown in horizontal section.

Operation of the valve elements 97, 98 and 99 is controlled simultaneously by means of a gear 105, on a shaft 89, upon which the control handle 79 is mounted (see Figures 5 and 6). The teeth of said gear have elongated faces and mesh with teeth formed in cylindrical valve operating sleeves 107, 108 and 109, which are slidably mounted within the chambers 100, 101 and 102 respectively. Said valve operating sleeves are each mounted on a flanged portion of a hollow supporting member 111, which is closed at its inner end and which extends within each sleeve. Each of said supporting members is slidably mounted on a pilot 112, which is bored to admit fluid therethrough to the inside of its associated supporting member, to exert a pressure on said supporting member in a direction to move said member along said pilot. Each of said pilots is herein shown as being secured to and extending inwardly from a threaded plug 113, which plugs are threaded in the outer or right-hand ends of said chambers.

A compression spring 114 extends within the valve operating member 107 of valve element 97 and is seated at one of its ends in the flanged portion of the member 111. The opposite end of said spring abuts a washer 175 on a seat 115, freely mounted on the inner or right-hand end of a piston valve 116 for the valve element 97. Said washer is provided to give a predetermined pressure difference between the valve elements 97 and 98, as will hereinafter more clearly appear as this specification proceeds. The connection between said seat and piston valve is loose, to avoid binding between said seat and valve and to cause an even pressure to be exerted on said valve by said spring.

A compression spring 117, in the chamber 101, extends within the valve operating sleeve 108 of valve element 98 and is seated at one of its ends in said sleeve. The opposite end of said spring is seated in a seat 118, freely connected with the inner or right-hand end of a slidable hollow piston 119 of the valve element 98, through a pin 120 (see Figure 9).

In a like manner, the valve operating sleeve 109 of valve element 99 has a compression spring 122 seated therein at one of its ends, and seated within a seat 123 at its opposite end. Said seat is freely mounted on the inner or right-hand end of a piston valve 124 of the valve element 99.

Fluid under pressure from the accumulator enters the charging valve element 97 through a passageway 125, connected with the pipe 50. This passageway is connected with said valve element by a port 127 in a valve cylinder 128, for said valve element. Said passageway is connected with the discharge valve element 99 by a port 174 in a valve cylinder 157 of said valve element. A passageway 144 connects said valve element 97 with the pressure adjusting valve element 98, and a passageway 160 connects said pressure adjusting valve element 98 with valve element 99.

Figure 8:
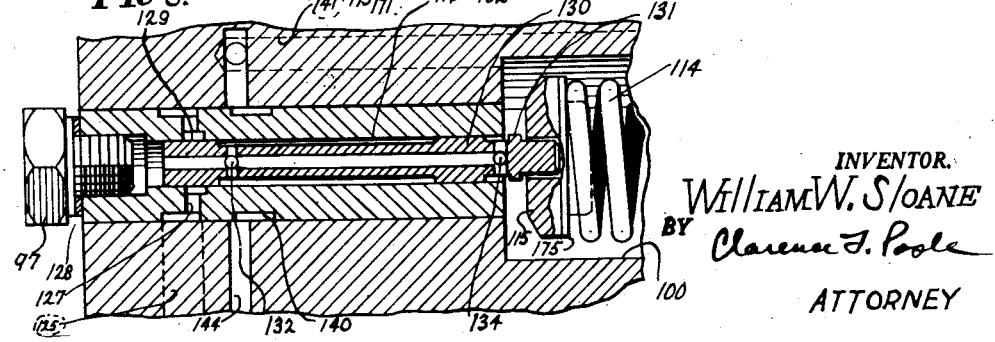
Figure 8 is an enlarged detail partial fragmentary longitudinal sectional view of the valve shown in Figure 7, with the valve shown in a fully open position for the release of fluid to the discharge.

The piston valve 116 of the charging valve element 97 has a land or piston 129 at the left-hand end thereof, which laps the port 127 and which serves to control opening or closing thereof (see Figures 7 and 8). Another land or piston 130 is spaced longitudinally from said land 129 and serves to guide said piston valve for movement along said cylinder. A third land or piston 131 is spaced from said last mentioned land, adjacent the right-hand end of said piston valve. Said last mentioned land serves as a valve to open or close the discharge opening from said cylinder to the chamber 100. Said piston valve is drilled longitudinally from the left-hand end thereof, for a portion of its length. Cross passages 132 are drilled to the right of land 129 and communicate with said longitudinal bore, so fluid under pressure may pass through said longitudinal bore and exert pressure on the left-hand end of said piston, to balance the pressure of the spring 114. Cross passages 134 are also bored between the lands 130 and 131, so fluid may pass through said longitudinal bore out through said cross passages into the chamber 100, when said piston valve is moved to the right and the land 131 is out of lapping engagement with the valve cylinder 128. The lands 129 and 131 are so spaced with relation to the port 127 and the end of the valve cylinder 128, that both ports may be closed at the same time with some lap at each valve.

A port 140 is provided in the valve cylinder 128, to the right of the port 127. Said port 140 communicates with the passageway 144, and with a passageway 141, which leads to the passageway in the pilot 112, for the valve operating sleeve 107. Pressure may thus be applied to the inside of the closed end of the hollow supporting member 111, to exert a force on said supporting member and valve operating sleeve in a direction towards the left, so as to balance the pressure of the spring 114 against said valve operating sleeve and the control handle 79.

When the valve piston 116 is moved to a position where fluid under pressure will pass through the port 127 into the annular space between the reduced portion of said valve piston and the inside of said cylinder walls, fluid will flow through the port 140 to the hollow supporting member for the valve operating sleeve 107. It will also flow through the passageway 144 to the pressure adjusting valve element 98.

The piston valve 124 of the discharge valve element 99 is slidably mounted in a valve cylinder 157. Said piston valve is provided with three spaced lands or pistons 169, 170 and 171, similar to the lands 129, 130 and 131 of the piston valve 116. A longitudinal passageway is drilled from the left-hand end of said piston valve. Cross passageways 172 are drilled into said central passageway between the lands 169 and 170. Cross passageways 173 are drilled into said central passageway between the lands 170 and 171, to release fluid through the inner end of the valve cylinder 157. Fluid entering said longitudinal passage through the cross passageways 172 may also exert pressure on the left-hand end of said piston, to balance the pressure of the spring 122. The lands 169 and 171 are so spaced with relation to the port 174 and end of the cylinder, that both ports may be closed at the same time, with some lap at each valve.

When the valve 169 of the valve element 99 is open, fluid will flow through the sleeve 157 in the space between the lands of the piston valve 124, through the passageway 160 and a passageway 176, to and through the pilot 112 of the valve operating member 108, to balance the pressure of the spring 122 on the control handle 79. Fluid will also flow through the central passageway in said piston to the head end of said piston valve, to exert pressure thereon and balance the pressure the spring 122 exerts against said piston valve.

The pressure adjusting valve element 98 consists of a poppet valve 151 which controls the admission of fluid to the control line 152 and a poppet valve 156 which controls the release of fluid from said control line, as will hereinafter more clearly appear as this specification proceeds. Said pressure adjusting valve includes a hollow threaded head 145, threaded in the left-hand end of the valve block 96, the hollow portion of which head has a reduced left-hand end of a plunger 147 slidably mounted therein. A coil spring 146 in said threaded head abuts the left-hand end of said plunger and tends to move said plunger to the right. A fixed valve cylinder 149 is spaced to the right of said threaded head and the space between said threaded head and cylinder forms a passageway for fluid from the valve element 97. The left-hand end of said valve cylinder is shaped to form a seat, which is adapted to be engaged by the right-hand end of an enlarged portion 150 of said plunger 147. Said enlarged portion and seat thus form the poppet valve 151 seated against the end of the valve cylinder 149, which will open or close upon a very slight movement of said plunger. Said poppet valve is adapted to open or close a passageway through said cylinder 149, leading to passageways 153 in said cylinder, which communicate with a pressure passageway 126 and the control line 52, for supplying fluid under pressure to the distributor valve 33. A passageway 154 leads from passageway 126, to and through the pilot for the valve operating sleeve 108 and to the hollow member 111 for said valve operating sleeve, for balancing the spring pressure exerted against said valve operating sleeve and the control handle 79.

The right-hand portion of the valve cylinder 149 has the hollow piston 119 slidably mounted therein. Said hollow piston has the right-hand end of the plunger 147 slidably mounted therein. The left-hand end of said hollow piston is shaped to form a seat for the right-hand end of an enlarged valve portion 155 of said plunger 147, to form the poppet valve 156, which controls the flow of fluid through the passageway 160 to the discharged valve element 99.

Displacement of the spring 114 towards the valve cylinder 149 will move the hollow piston 119 and plunger 147 in a direction to open the poppet valve 151, to admit fluid under pressure to the pressure line 153. Fluid pressure exerted on said hollow piston to the right, against said compression spring 117, will tend to move said hollow piston to the right to open the valve 156 and permit the discharge of fluid through the passageway 160.

The plunger 147 is longitudinally drilled from the left-hand end thereof and is cross-drilled just to the right of the valve 151, to admit fluid under pressure to the left-hand end of said plunger. Pressure is exerted on the right-hand end of said plunger through a passageway 152, a port 158 in the valve cylinder, and a passageway 159 in the hollow piston 119. Pressures will thus be exerted on the left-hand end of said plunger to balance pressure exerted against the right-hand end of said plunger, and will also be exerted in a direction towards the left in the annular spaces under the valves 151 and 156. This gives an accurate balance for the valves except for the pressure that is on the valve seats. Pressure is also exerted on the hollow piston 119 in a direction towards the right, against the spring 117, to balance said spring and tend to open the poppet valve 156. The poppet valve 151 is closed by the spring 146 and by pressure on the head end of the plunger 147.

Since the distribution of pressure on the poppet valve seat 151 may be irregularly distributed, it cannot be accurately determined and it cannot be counterbalanced. Thus, if pressure is applied from the valve spring through the piston 119 and valve 156 to open valve 151, it must overcome any pressure that is exerted against the valve seat of the valve 151. If pressure were admitted to this valve directly from the accumulator through passage 144, and it was desired to established a comparatively low pressure in the control line 52, sufficient extra pressure would have to be put on the spring 117, to overcome the unbalanced pressure on the valve seat. This would result in considerable inaccuracy. The reason is that after the valve has once opened, the unbalanced pressure will be changed and it will not close at a point corresponding to the handle position at which the valve opened. If, however, the pressure differences between the passage 144, through which fluid is admitted to the valve, and the passage 160 from which fluid is discharged, are kept small; that is, not greater than twice an assumed pressure which will be designated as "A" pounds per square inch, the unbalanced pressure on the valve seat becomes extremely small and the pressure in control line 52 can be held to a small tolerance. The valve seat of valve 156 also has an unbalanced pressure and the same situation exists there. It is therefore the duty of valve element 99 to maintain a pressure in passage 160 between zero and "A" pounds per square inch below the desired pressure in the control line 52, and it is the duty of valve element 97 to maintain a pressure in passage 144 between zero and "A" pounds per square inch above the desired pressure in the control line 52.

The theory of operation of the pressure control valve mechanism will now be described.

When the operating handle 79 is at an off position, the spring 114 of the charging valve element 97 should exert a pressure which will balance a predetermined pressure in the passageway 144, which for the purposes of illustration may be designated as "A" pounds per square inch, when the right-hand edge of the piston or land 129 is in line with the right-hand edge of the port 127, and all of the lap is on the piston or land 131, closing the cross passages 134 to the return. There will thus always be a pressure of "A" pounds per square inch in the passageway 144, when the valve is in an off position.

The spring 122 of the discharge valve element 99, bearing against the end of the piston valve 124, should be free, and the right-hand edge of the land 169 should be in line with the right-hand edge of the port 174 and all of the lap should be on the land 171.

Both poppet valves 151 and 156 should be closed and the spring 117 in valve element 98 should be compressed to an amount that will balance "A" pounds per square inch on the right-hand end of the hollow piston 119.

In the form shown herein, the valve elements 97 and 99 are alike in all respects, so the increased pressure on valve element 97 is accomplished by placing the washer 175 under the spring 114, said washer herein being shown as having a thickness approximately equal to the lap of the land 131 of said valve element 97 when the operating handle 79 is at an off position. Said lap is equal to the combined laps of the valves 129 and 131 when the port 127 is just closed and the valve 131 is fully lapped.

When the control handle is in this off position, and the right-hand edge of the piston 129 is in line with the right-hand edge of the port 127, any leakage of fluid through the valve formed by said land will permit fluid to flow in the annular space between the reduced portion of said valve piston and the inside of said valve cylinder, to the passage 144 and to the pressure adjusting valve element 98. It will also flow through the hollow valve center to the head or left-hand end of the piston valve 116. As pressure builds up against the head of said piston valve, it will force said piston valve against the spring 114 until the leakage is stopped, or until the land 131 opens the end of the valve cylinder.

Also, any leakage through the valve formed by the land 169 of the discharge valve element 99 will permit fluid to flow into the annular space between the valve cylinder 157 and the reduced portion of the piston valve 124, into the passage 160. It will also flow through the hollow valve center to the head end of said piston valve. As pressure builds up against the head end of said piston valve, it will force said piston valve against the spring 122 until the leakage is stopped, or until the piston 171 opens the end of the valve cylinder. This will cause a release of pressure in the annular space between the valve cylinder and reduced portion of the valve piston, until the valve is balanced, which will prevent the further discharge of fluid.

If the increases in pressure in valve elements 97 and 99, caused by opening the valves 129 and 169 against their respective springs, is designated as "A" pounds per square inch as before, then for any position of the operating handle, the pressure in passage 144 may increase from the pressure in the control line 52 by the amount of "A" pounds per square inch, and the pressure in passage 160 may vary from the pressure in the control line by the amount of "A" pounds per square inch lower than the pressure in said control line, according to whether the position has been reached from one of higher pressure or from one of lower pressure, and according to the relative leakages of the valves 129 and 131 and the valves 169 and 171.

If the control handle 79 is moved from a lower pressure position to a higher pressure position, the spring 114 of the charging valve element 97 will force the piston 129 to open the port 127, admitting fluid from the accumulator 35 through port 127 and through the hollow valve stem to the head of the valve piston 116. This admission of fluid will normally cease when the port closes, and the pressure built up in passage 144 will depend upon the effort exerted by the spring in this position, but if the valve 129 continues to leak, additional pressure will be built up, forcing the piston valve against the spring until possibly the valve 131 is open, in which case the pressure in the passageway 144 would have been increased by an amount equal to "A" pounds per square inch.

The spring 122 of the discharge valve element 99 will also force the land or piston 169 to open the port 174, admitting fluid from the passage 125 and through the hollow valve stem to the head end of hollow valve piston 124. When the port closes, the pressure built up in the passage 160 will depend upon the effort exerted by the spring 122, but if the valve 169 continues to leak, additional pressure will be built up until possibly the land 171 is open, in which case the pressure in the passageway 160 would have been increased by an amount equal to "A" pounds per square inch, as in the valve element 97.

If it is assumed that a pressure of 100 pounds per square inch is desired in the control line 52 and that the pressure difference "A" is equal to 30 pounds per square inch when the control handle is in an off position, when the control handle is turned to a position corresponding to 100 pounds, fluid from the accumulator 35 will be admitted to valve element 97 until 100 pounds pressure has been built up against the piston valve 116, at which point this valve will close. The 100 pounds pressure built up in valve element 97 will be applied to valve element 98 through passage 144. Pressure from the accumulator will be admitted to valve element 99 until a pressure of 70 pounds has been admitted to said valve element and through it and passage 160 to valve element 98. The poppet valve 151 will be open at the same time the valves in valve elements 97 and 99 open, and the pressure from valve element 97 through passage 144 into the valve cylinder 149 and passage 126 will be applied to the control line 52. When this 100 pounds pressure has been reached in the control line, valve 151 will return to its seat and the distributor valve will respond to the 100 pounds pressure. Since the pressure admitted through the poppet valve 151 from the passageway 144 exceeds the back pressure effective on the poppet valve 156 from the passageway 160, the latter poppet valve 156 remains closed.

If while the operating handle is in a position to give 100 pounds pressure to the distributor valve, fluid may leak through valve element 97 into passage 144 until 130 pounds pressure has been reached, any leakage that would tend to carry the pressure beyond this point will be released through the valve 131 at the end of the cylinder.

If the control handle is now advanced to a point calling for 200 pounds in the control pipe 52, valve elements 97 and 99 will open, to admit fluid to passages 144 and 160, the same way as before. At the same time, the valve element 98 by responding more quickly than either valve elements 97 or 99, will be open against a back pressure of not over 30 pounds per square inch distributed over the valve seat. When 200 pounds pressure in the control line has been reached, all of the valves are closed.

While the pressures applied to passage 144 might exceed those in control pipe 52 by 30 pounds, and the pressure in passage 160 will be not over 30 pounds less than the pressure in control pipe 52, the pressure in said control line will vary only a few pounds from the desired pressure because it requires only a few pounds difference in pressure, to overcome the unbalanced valve seat areas against a back pressure of 30 pounds per square inch over the relatively small area of the valve seat of the valve 151.

When the control handle 79 is moved in an off direction from a point calling for 200 pounds pressure in the control line 52 to a point calling for 100 pounds in said control line, the foregoing operations will be reversed. Fluid will be released from the control line 52 through the poppet valve 156, passage 160 and valve 171, and will be released from the valve element 97 through the valve 131 and end of the valve cylinder to the spring chamber 102. The pressure difference on opposite sides of the valve 156 will be maintained by the valves 171 and 131 to overcome the unbalanced pressure on the valve seat. The reductions in pressures exerted by the spring 114 and 122 of the respective valve elements 97 and 99 will allow pressure on the head ends of the valve pistons 116 and 124 to open the passageways from the ends of valve cylinders 128 and 157 to the respective chambers 100 and 102 and the return line 53. Pressure will be released from the valve cylinder 157 until a pressure of 100 pounds is reached in the passageways 154 and 160. Pressure will also be released from the chamber 128 until a pressure of 130 pounds is reached in the passageway 144.

At the same time the valve element 99 opens to the return, the poppet valve 156 will open against a back pressure and not over 60 pounds per square inch on the valve seat and will close when a pressure of substantially 100 pounds is reached in the control line.

A notching cam 87 on shaft 89 for the control handle 79 is provided with a plurality of spaced notches 178, 178 formed in the periphery thereof, which designate the various positions at which definite step by step pressures are established and maintained in the control line 52, so that the distributor valve 33 will have a full opening of the corresponding port. The various positions of said control handle are indexed by means of a roller 179 on the end of a rocking arm 180, which is yieldably pressed into engagement with said notches 178 by means of a spring 181, engaging said rocking arm.

An interlocking connection is provided between the control valve 51 and the 4-way reversing valve 65, to prevent operation of said reversing valve except when said control valve is in an off position, and to prevent operation of said control valve except when said reverse valve is in a forward or a reverse position. Said interlocking connection, as herein shown, includes a disk 183 secured to the shaft 89, just above the notching cam 87, and adapted to be engaged by an engaging end 184 of a rocking arm 185. Said disk is provided with a notch 186 on the face thereof, which corresponds with the off position of said control valve, and which is adapted to be engaged by said projecting engaging end. Said rocking arm is provided with an engaging end 189, spaced from and extending in an opposite direction from the engaging end 184, which is adapted to register for engagement with either one of a pair of notches 190, 190 on a locking plate 191, which is secured to a shaft 192 for said reverse valve 65.

When the control valve 51 is in an off position, the projecting end 184 of the rocking arm 185 may engage the notches 186, 186 of the disk 183. When said end of said rocking arm is in engagement with said recessed portion of said disk, the locking plate 191 and valve shaft 192 will be free to pivot. When the reversing valve is in an intermediate position, between an extreme forward or reverse position, the engaging end 189 of the arm 185 will engage the high spot between the notches 190, 190 and the engaging end 184 will be held in engagement with the recessed portion 186, to lock the control handle 79 against turning until the locking plate 191 is in a position to permit the engaging end 189 to drop into either one of the notches 190, 190, at which time said reverse drum will be in either a forward or reverse position. When said engaging end 184 is moved out of engagement of said notch 186, said engaging end 189, engaging either of said notches 190, 190, will be held in engagement with either of said notches by said engaging end 189 and star wheel, to lock said reversing valve from turning movement until said control handle 79 has been moved to turn the control valve 51 to an extreme off position, so said engaging end 184 may drop into the notch 186.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a variable pressure hydraulic control valve, a valve block, a pressure inlet leading into said block, a variable pressure passageway in said block, a low pressure discharge outlet, a chamber in said block, a valve in said chamber controlling the passage of fluid from said pressure inlet to said pressure outlet, said valve including a pair of cooperating poppet valves for controlling the passage of fluid from said inlet to said outlet and from said outlet to said discharge opening, and comprising a sleeve having passageways therein leading from said inlet to said outlet, a hollow piston slidably movable within said sleeve and having passageways therein communicating with said pressure inlet and discharge opening, a plunger slidably movable within said sleeve and hollow piston, said plunger having a pair of valves thereon, one of said valves being adapted to be seated against one of said sleeves and form one poppet valve, for opening or closing the passageway therein and the other of said valves being adapted to be seated against said other sleeve and form the other poppet valve, for opening or closing the passageway therein, a spring in said chamber and having engagement with said hollow piston for urging said piston in a direction to close said discharge poppet valve and open said pressure poppet valve, and means for displacing said spring to increase or decrease the pressure of fluid in said pressure outlet.

2. In a variable pressure hydraulic control valve, a valve block, a pressure inlet leading into said block, a variable pressure passageway in said block, a low pressure discharge outlet, a chamber in said block, a valve in said chamber controlling the passage of fluid from said pressure inlet to said pressure outlet, said valve including a pair of cooperating poppet valves for controlling the passage of fluid from said inlet to said outlet and from said outlet to said discharge opening, and comprising a sleeve having passageways therein leading from said inlet to said outlet, a hollow piston slidably movable within said sleeve and having passageways therein communicating with said pressure inlet and discharge opening, a plunger slidably movable within said sleeve and hollow piston, said plunger having a pair of valves thereon, one of said valves being adapted to be seated against one of said sleeves and form one poppet valve for opening or closing the passageway therein and the other of said valves being adapted to be seated against said other sleeve and form the other poppet valve, for opening or closing the passageway therein, a spring in said chamber having engagement with said hollow piston for urging said piston in a direction to close said discharge poppet valve and open said pressure poppet valve, means for displacing said spring to increase or decrease the pressure of fluid in said pressure outlet, fluid means acting against said hollow piston and spring for balancing the pressure of said spring and causing said piston to move against said spring to close said pressure poppet valve and open said discharge poppet valve, and a pair of piston valves connected with said pressure inlet, for reducing the pressure therein and maintaining a pressure difference on opposite sides of said poppet valves within predetermined limits, throughout their entire pressure ranges.

3. In a variable pressure hydraulic control valve mechanism, a high pressure line, a variable pressure line, a control handle for operating said valve, and means operated by said control handle for causing said valve to establish the same pressures in said variable pressure line for the same positions of said control handle when said control handle is moved in an on or an off direction, including two piston valves, connections from said high pressure line to the inlet sides of said piston valves, two poppet valves, the pressure discharge side of one piston valve being connected with the inlet side of one poppet valve and the discharge side of the other poppet valve being connected with the pressure discharge side of the other piston valve, said valves being simultaneously operable and said piston valves being arranged to maintain pressure differences on opposite sides of said poppet valves within predetermined limits, to reduce the variations in opening and closing pressures of said poppet valves caused by the unbalanced pressures on the valve seats thereof.

4. In a variable pressure hydraulic control valve mechanism, two piston valves, a high pressure line, a connection from said high pressure line to each of said piston valves, two poppet valves, a variable pressure line connected with said poppet valves, one of said valves being arranged to supply fluid under pressure to said variable pressure line and the other of said poppet valves being arranged to release fluid from said variable pressure line, a return line leading from said last mentioned poppet valve to one of said piston valves, means for operating said valves in unison, a pressure connection from one piston valve to said poppet valve which supplies fluid under pressure to said variable pressure line, and a pressure connection from said other piston valve to said return line, for maintaining a pressure difference between said pressure connection to said poppet valve which supplies fluid under pressure to said variable pressure line and said return line within predetermined limits throughout the entire pressure range of said control valve.

5. In a variable pressure hydraulic control valve mechanism, a variable pressure line, two pressure controlled poppet valves, one of which serves to admit fluid to said variable pressure line at a predetermined pressure and the other of which serves to release fluid from said pressure line, a high pressure line, two piston valves connected with said high pressure line, means for operating said piston and poppet valves in unison, one of said piston valves being adapted to supply pressure from said high pressure line to said poppet valve which controls the admission of pressure to said variable pressure line, at a pressure reduced from the pressure of said high pressure line, and the other of said piston valves being adapted to control the admission of pressure to the discharge side of said poppet valve which controls the release of pressure from said variable pressure line at a pressure reduced from the pressure in said high pressure line, and also being adapted to release fluid pressure from said last mentioned valve, to maintain a pressure difference on opposite sides of said poppet valves within predetermined limits throughout the entire pressure range of said control valve to reduce the variation in opening and closing pressures of said poppet valves caused by the unbalanced pressures on the valve seats thereof.

6. In a variable pressure hydraulic control valve mechanism, a high pressure line leading to said valve, a variable pressure line leading from said valve, a poppet valve for controlling the admission of fluid under pressure to said variable pressure line, another poppet valve for releasing fluid from said variable pressure line, and means operable simultaneously with said poppet valves for reducing the unbalanced pressure on the valve seats of said poppet valves to a minimum value and for maintaining this unbalanced pressure at a minimum value throughout the entire pressure range of said valves including a piston valve adapted to admit fluid at a pressure reduced from the pressure in said high pressure line to the pressure side of said first mentioned poppet valve, another piston valve adapted to admit fluid at a pressure reduced from the pressure in said high pressure line to the discharge side of said second mentioned poppet valve, which last named pressure may be of a lower value than the pressure in said variable pressure line, so said piston valves may maintain pressure differences within predetermined limits on opposite sides of said poppet valves throughout their entire pressure range, to reduce the variations in opening and closing pressures of said poppet valves caused by the unbalanced pressures on the valve seats thereof.

7. In a variable pressure hydraulic control valve mechanism, a control handle therefor, a high pressure line leading to said valve, a variable pressure line leading from said valve, and means for establishing the same pressures in said variable pressure line for the same positions of said control handle when said control handle is moved in an on or off direction including a poppet valve for controlling the admission of fluid under pressure to said variable pressure line, another poppet valve for releasing fluid from said variable pressure line, and means for reducing the unbalanced pressure on the valve seats of said poppet valves to a minimum value and for maintaining this unbalanced pressure at a minimum value throughout the entire pressure range of said valves including a variable pressure piston valve adapted to admit fluid at a pressure reduced from the pressure in said high pressure line to the pressure side of said first mentioned poppet valve, another variable pressure piston valve adapted to admit fluid at a pressure reduced from the pressure in said high pressure line to the discharge side of said second mentioned poppet valve, which last named pressure may be of a lower value than the pressure in said variable pressure line, so said piston valves may maintain pressure differences within predetermined limits on opposite sides of said poppet valves throughout their entire pressure range, and means operated by said control handle for simultaneously operating said piston and poppet valves to cause a predetermined step by step increase or decrease in the pressure in said variable pressure line.

8. In a variable pressure hydraulic control valve mechanism, a control handle therefor, a high pressure line leading to said valve, a variable pressure line leading from said valve, and means for establishing the same pressures in said variable pressure line for the same positions of said control handle when said control handle is moved in an on or off direction including a poppet valve for controlling the admission of fluid under pressure to said variable pressure line, another poppet valve for releasing fluid from said variable pressure line, and means for reducing the unbalanced pressure on the valve seats of said poppet valves to a minimum value and for maintaining this unbalanced pressure at a minimum value throughout the entire pressure range of said valves including a variable pressure piston valve adapted to admit fluid at a pressure reduced from the pressure in said high pressure line to the pressure side of said first mentioned poppet valve, another variable pressure piston valve adapted to admit fluid at a pressure reduced from the pressure in said high pressure line to the discharge side of said second mentioned poppet valve, which last named pressure may be of a lower value than the pressure in said variable pressure line, so said piston valves may maintain pressure differences within predetermined limits on opposite sides of said poppet valves throughout their entire pressure range, and means operated by said control handle for simultaneously operating said piston and poppet valves to cause a predetermined step by step increase or decrease in the pressure in said variable pressure line, including a separate spring operatively connected with each of said piston valves, a third spring operatively connected with said poppet valves, and operative connections from said control handle to said springs for simultaneously displacing said springs.

9. In a variable pressure hydraulic control valve mechanism, a control handle therefor, a high pressure line leading to said valve, a variable pressure line leading from said valve, and valve means operable in unison for reducing the pressure from said high pressure line and establishing the same pressures in said variable pressure line for the same positions of said control handle when said control handle is moved in an on or an off direction including a substantially balanced poppet valve controlling the admission of fluid under pressure to said variable pressure line, another substantially balanced poppet valve cooperating with said first mentioned poppet valve for releasing fluid from said variable pressure line, and means for reducing the unbalanced pressures on the valve seats of said poppet valves and for maintaining these unbalanced pressures at such reduced values throughout the entire pressure ranges of said valves including a balanced piston valve adapted to reduce the pressure from said high pressure line and admit fluid at a reduced pressure to the pressure side of said first mentioned poppet valve, and another balanced piston valve adapted to reduce the pressure from said high pressure line and admit fluid at a reduced pressure to the discharge side of said second mentioned poppet valve.

10. In a variable pressure hydraulic control valve mechanism, a control handle therefor, a high pressure line leading to said valve, a variable pressure line leading from said valve, and means for reducing the pressure from said high pressure line and establishing the same pressures in said variable pressure line for the same positions of said control handle when said control handle is moved in an on or off direction including a substantially balanced poppet valve controlling the admission of fluid under pressure to said variable pressure line, another substantially balanced poppet valve cooperating with said first mentioned poppet valve for releasing fluid from said variable pressure line, means for reducing the unbalanced pressures on the valve seats of said poppet valves and for maintaining these unbalanced pressures at such reduced values throughout the entire pressure range of said valves including a balanced piston valve adapted to reduce the pressure from said high pressure line and admit fluid at a reduced pressure to the pressure side of said first mentioned poppet valve, another balanced piston valve adapted to reduce the pressure from said high pressure line and admit fluid at a reduced pressure to the discharge side of said second mentioned poppet valve, and means operated by said control handle for simultaneously operating said piston and poppet valves to cause a predetermined step by step increase or decrease in the pressure in said variable pressure line including a separate spring operatively connected with each of said piston valves, a third spring operatively connected with said poppet valves, and operative connections from said control handle to said springs for simultaneously displacing said springs, to open or close said valves.

11. In a variable pressure hydraulic control valve mechanism, two piston valves, a separate spring for operating each of said valves, means for balancing said valves against said springs, two cooperating poppet valves, a single spring for opening one of said poppet valves and closing the other of said poppet valves, means for balancing said poppet valves against said spring, means for simultaneously displacing said springs for operating said valves, the pressure discharge side of one piston valve being connected with the inlet side of one poppet valve, and the pressure discharge side of the other piston valve being connected with the outlet side of said other poppet valve, so said piston valves will maintain a pressure difference on opposite sides of said poppet valves within predetermined limits throughout the entire pressure ranges of said valves, to reduce the variations in opening and closing pressures of said poppet valves caused by the unbalanced pressures on the valve seats thereof.

12. In a variable pressure hydraulic control valve mechanism, two piston valves, a separate spring for operating each of said valves, means for balancing said valves against said springs, two cooperating poppet valves, a single spring for opening one of said poppet valves and closing the other of said poppet valves, means for balancing said poppet valves against said spring, the pressure discharge side of one piston valve being connected with the inlet side of one poppet valve, and the pressure discharge side of the other piston valve being connected with the outlet side of said other poppet valve, so said piston valves will maintain a pressure difference on opposite sides of said poppet valves within predetermined limits throughout the entire pressure ranges of said valves, to reduce the variations in opening and closing pressures of said poppet valves caused by the unbalanced pressures on the valve seats thereof, a control handle, and operative connections between said control handle and said springs, for simultaneously displacing said springs and operating said valves in unison.

13. In a variable pressure hydraulic control valve mechanism, a high pressure line, a variable pressure line, a control handle for operating said valve mechanism, and a plurality of valve means operated in unison by said control handle for causing said valve mechanism to establish the same pressures in said variable pressure line for the same positions of said control handle when said control handle is moved in an on or an off direction, including two piston valves, connections from said high pressure line to the inlet sides of said piston valves, a separate spring for opening each of said valves to admit pressure from said high pressure line, fluid passage means for balancing said valves against said springs, two poppet valves, a single spring for opening one of said poppet valves and closing the other of said poppet valves, fluid passage means for substantially balancing said valves against said spring, one of said poppet valves being connected with said variable pressure line, to supply fluid under pressure thereto, and the other of said poppet valves being adapted to release fluid from said variable pressure line, a connection from the pressure discharge side of one piston valve to the pressure inlet side of said poppet valve which supplies fluid under pressure to said variable pressure line, and a connection from the pressure discharge side of said other piston valve to the discharge side of said poppet valve which releases fluid from said variable pressure line, for maintaining a pressure difference on opposite sides of said poppet valves within predetermined limits throughout the entire pressure range of said valve, to reduce the variations in opening and closing pressures of said poppet valves caused by the unbalanced pressures on the valve seats thereof.

14. In a variable pressure hydraulic control valve mechanism, a high pressure line, a variable pressure line, a control handle for operating said valve mechanism, and means operated by said control handle for causing said valve mechanism to establish the same pressures in said variable pressure line for the same positions of said control handle when said control handle is moved in an on or an off direction, including two piston valves, connections from said high pressure line to the inlet sides of said piston valves, a separate spring for opening each of said valves to admit pressure from said high pressure line, fluid passage means for balancing said valves against said springs, two poppet valves, a single spring for opening one of said poppet valves and closing the other of said poppet valves, fluid passage means for substantially balancing said valves against said spring, one of said poppet valves being connected with said variable pressure line, to supply fluid under pressure thereto, and the other of said poppet valves being adapted to release fluid from said variable pressure line, a connection from the pressure discharge side of one piston valve to the pressure inlet side of said poppet valve which supplies fluid under pressure to said variable pressure line, a connection from the pressure discharge side of said other piston valve to the discharge side of said poppet valve which releases fluid from said variable pressure line, for maintaining a pressure difference on opposite sides of said poppet valves within predetermined limits throughout the entire pressure range of said valve, to reduce the variations in opening and closing pressures of said poppet valves caused by the unbalanced pressures on the valve seats thereof, and operative connections between said control handle and said springs for simultaneously displacing said springs and operating said valves in unison.

WILLIAM W. SLOANE.